United States Patent [19]

Norman et al.

[11] 4,089,939

[45] May 16, 1978

[54] PROCESS FOR THE PRODUCTION OF HYDROGEN FROM WATER

[75] Inventors: John H. Norman; John L. Russell, Jr., both of La Jolla; Susan A. Stowell, San Diego, all of Calif.

[73] Assignee: General Atomic Company, San Diego, Calif.

[21] Appl. No.: 772,308

[22] Filed: Feb. 25, 1977

[51] Int. Cl.² .......................... C01B 1/02; C01B 7/18; C01B 17/74

[52] U.S. Cl. ................................ 423/648 R; 423/481; 423/500; 423/522

[58] Field of Search ............... 423/648, 539, 481, 522, 423/500

[56] References Cited

U.S. PATENT DOCUMENTS

| 2,143,222 | 1/1939 | Heath | 423/481 X |
| 2,406,930 | 9/1946 | Titlestad | 423/522 |
| 3,365,276 | 1/1968 | Childs et al. | 423/648 |
| 3,888,750 | 6/1975 | Brecher et al. | 423/539 X |
| 3,929,980 | 12/1975 | Abraham et al. | 423/648 |

OTHER PUBLICATIONS

Mellor's Comp. Treatise on Inorg. and Theo. Chem., Supp. II, Part I, 1956 Ed., p. 865. Longmans, Green & Co., N.Y.

Jacobson's "Encyclopedia of Chem. Reactions," vol. 3, 1949 Ed., p. 709. Reinhold Pub. Corp., N.Y.

McPherson & Henderson book "A Course in General Chem.," Third Ed., 1927, p. 372. Ginn & Co., N.Y.

Primary Examiner—Edward Stern
Attorney, Agent, or Firm—Fitch, Even, Tabin & Luedeka

[57] ABSTRACT

Hydrogen is produced from water by reacting $I_2$, $SO_2$ and $H_2O$ to make hydrogen iodide and sulfuric acid. $SO_2$ is present in a substantial molar excess with respect to the available $H_2O$ and $I_2$ is also present in excess to cause the formation of a lighter sulfuric acid-bearing phase and a heavier hydrogen iodide-bearing phase. The heavier phase is separated from the lighter phase, degassed to remove $SO_2$ and then treated with additional HI and $I_2$ to cause the formation of a light immiscible fraction containing sulfuric acid and water which is removed to substantially reduce the sulfur content of the degassed phase. Finally, the hydrogen iodide product is separated and decomposed to produce hydrogen.

13 Claims, 1 Drawing Figure

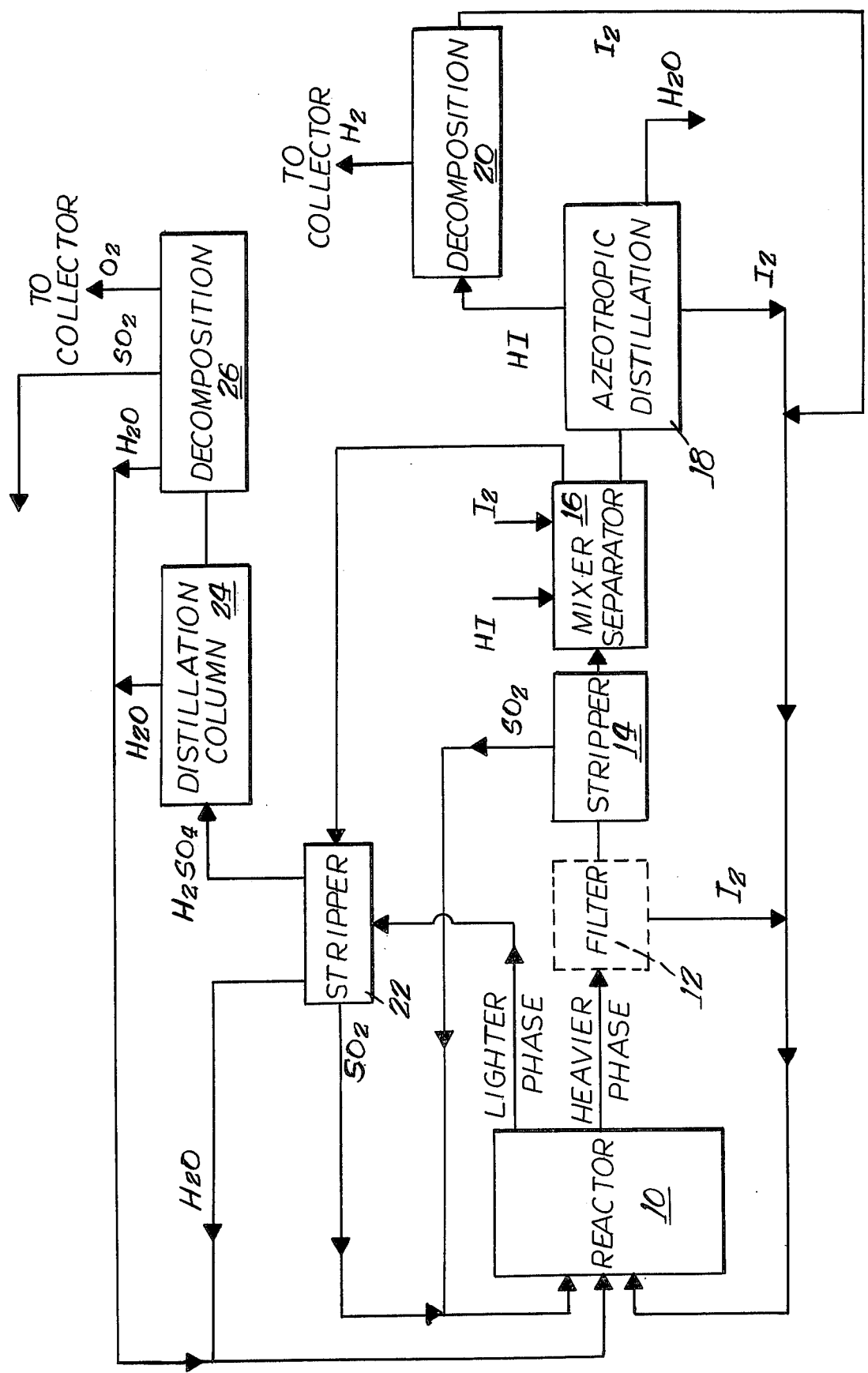

PROCESS FOR THE PRODUCTION OF HYDROGEN FROM WATER

This invention relates to the production of elemental hydrogen and more particularly to cycles for producing elemental hydrogen from water, especially those which utilize thermochemical reactions.

Nuclear reactors built for commercial power generation produce large quantities of heat, which has heretofore generally been used for the generation of steam to power turbines that drive electrical generators. The cost of producing hydrogen in commercial quantities has risen substantially with recent rises in the price of natural gas and petroleum feedstocks, from which hydrogen has heretofore generally been produced. The electrolytic decomposition of water provides still another way of producing elemental hydrogen; however, the high cost of electric power to effect such an electrolytic decomposition has heretofore made this process economically impractical on a very large, commercial scale.

In addition to its present chemical uses, hydrogen has often been mentioned as a possible way of storing energy until needed. By feeding stored hydrogen to fuel cells or to combustion processes, electricity can be generated; however, the high cost of hydrogen has heretofore limited its use in such a fashion.

Various thermochemical cycles have been proposed for the creation of hydrogen, and from an efficiency standpoint, a number of these appear to be eminently sensible. However, from a practical standpoint, none of these thermochemical cycles has been without its drawbacks. For instance, the direct thermal decomposition of water requires temperatures well above 2000° C., which temperatures presently render such a process inefficient and apparently impractical for commercial implementation in the near future.

Several series of chemical reactions have been proposed as cycles for arriving at the end result of creating hydrogen from water; however, these too have not been without their problems. For example, U.S. Pat. No. 3,929,980, issued Dec. 30, 1975 to Abraham et al., utilizes a series of steps which involve the reaction between crystalline iodine and molten potassium nitrate, and after several subsequent steps, it produces aqueous hydrogen iodide that is ultimately thermally decomposed to produce hydrogen. U.S. Pat. No. 3,839,550, issued Oct. 1, 1974 to Wentorf, Jr., teaches a closed-cycle thermochemical process for producing hydrogen by the decomposition of water which is keyed to the reaction of hot liquid iodine with lithium hydroxide to produce lithium iodide, which ultimately is hydrolyzed to create hydrogen iodide, which in turn is thermally decomposed to produce hydrogen. Both of these processes have fairly complex step-wise requirements and have not been proved to be economically practicable at the present time.

A further process has been proposed for producing thermochemically-decomposable hydrogen iodide as a part of a closed-cycle which is based upon the Bunsen equation:

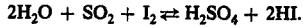

In this cycle, sulfur dioxide, water and iodine are reacted to produce sulfuric acid and hydrogen iodide.

It is an object of the present invention to provide an improved thermochemical cycle for the production of hydrogen from water based upon the Bunsen equation. Another object of the invention is to provide improvements in a hydrogen-making cycle, which uses the Bunsen equation to produce a two-phase liquid system, by increasing the efficiency with which the reaction products are recovered from the resultant phases. A further object of the invention is to provide an improved cycle of this type wherein, following separation of the two liquid phases from each other, residual amounts of sulfuric acid are effectively removed from the heavier phase. These and other objects of the invention will be apparent from the following detailed description when read in conjunction with the appended drawing of an illustrative flow sheet showing a presently preferred embodiment of the invention.

When the chemical reaction described by the Bunsen equation is carried out under conditions where an excess of both sulfur dioxide and iodine exists, a two-phase liquid system is created which is susceptible to liquid-liquid separation. This process is described in more detail in co-pending U.S. patent application Ser. No. 601,917, filed Aug. 4, 1975, now abandoned. The more dense or heavier phase contains the major fraction of the excess reactants, plus most of the hydrogen iodide that is produced, which because of the excess iodine present, is in the form of polyiodides, i.e., $HI_3$, $HI_5$, etc. The lighter phase contains most of the sulfuric acid as an aqueous solution; however, some sulfuric acid is contained in the heavier phase. As used herein, the term "hydrogen iodide" is used to denote generally HI, as well as $HI_3$ and higher hydrogen ployiodides.

Because the chemical reaction exemplified by the Bunsen equation is reversible, there is a tendency for the reaction products present in the heavier phase to react with each other and thus decrease the overall yield. This tendency is increased when the heavier phase is degassed to remove the excess sulfur dioxide, the presence of which in the aqueous solution tends to drive the Bunsen equation to the right. However, it has been found that, by promptly adding additional hydrogen iodide and iodine to the degassed heavier phase, formation of an additional quantity of a light immiscible phase containing sulfuric acid and water occurs. In this fashion, substantially all of the sulfur can be eliminated from the heavier phase, and the additional sulfuric acid, which is thus obtained, is added to the lighter phase. Operation in this manner not only increases the ultimate oxygen by-product, but also increases the recovery of $SO_2$, when the thermal decomposition of the sulfuric acid is eventually carried out in accordance with the equation:

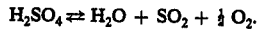

Basically, although the chemical reaction exemplified by the Bunsen equation has long been known, the products, sulfuric acid and hydrogen iodide are not separable by distillation, and thus it has been necessary to investigate other methods of separation. By operating the Bunsen equation reaction under conditions wherein excesses of sulfur dioxide and iodine are present, a heavier phase and a lighter phase are created which are then susceptible to liquid-liquid separation. Of course, the Bunsen equation is a reversible reaction which does not go to completion, and the equilibrium constants of the reactants determine the extent to which the reaction proceeds. This fact, coupled with the fact that water is both a reactant and a solvent for both phases, renders precise definition of the relative amounts somewhat difficult. In general, although dependent somewhat upon the temperature, no more than about 10 percent of the water which is present will take part in the reaction, regardless of the amounts of $SO_2$ and $I_2$, as the remainder of the water fulfills its function as a solvent to permit the main chemical reaction to proceed. Thus, it is appropriate to base any stoichiometric calculations upon this 10 percent figure.

Sulfur dioxide should be present in at least a slight excess to aid in driving the reaction to the right, and in order to facilitate the presence of the desired amount of sulfur dioxide in the reaction mixture, the reaction may be carried out under greater than atmospheric pressure. Alternatively, reduced temperatures, e.g., down as low as about $-60°$ C., may be used should it be desired to increase the amount of $SO_2$ present to provide this driving force while still at atmospheric pressure. In general, operation at about room temperature (i.e., about 21° C.) and atmospheric pressure maintains the sulfur dioxide sufficiently well dissolved in the liquid to effectively drive the reaction to the right; however higher temperatures may be used. Accordingly, use of temperatures between about $-30°$ C. and about 115° C. is generally contemplated, and room temperature application is considered representative and convenient (although other temperatures may be preferred depending on the circumstances.

Gaseous $SO_2$ is usually supplied by bubbling through the liquid system where the reaction occurs, and it is convenient to simply carry out the reaction under saturation conditions with $SO_2$ at about atmospheric pressure. Under these conditions sulfur dioxide dissolves in the aqueous solution in a molar amount more than twice the stoichiometric amount of water (based upon 10 percent of the total amount of water present). Moreover, under these conditions additional $SO_2$ is continuously available to dissolve in the solution to replace that which reacts to form $H_2SO_4$.

As earlier indicated, iodine is also supplied in an excess amount (also based upon 10 percent of the water), and preferably iodine is supplied in an amount approaching the saturation concentration of iodine in water. In addition to driving the Bunsen equation to the right, iodine complexes with the hydrogen iodide reaction product and creates hydrogen polyiodides and ultimately the distinct two-phase liquid system.

The Bunsen reaction normally creates hydriodic acid; however, the excess amount of iodine which is present results in the creation of polyiodide acids, such as $HI_3$ (hydrogentriiodide), in solution. If the reaction is carried out at room temperature and at a ratio of 0.5 gram $I_2$ for each gram of $H_2O$, a single phase reaction system results that has the characteristic yellow color of the $HI-SO_2$ complex. However, as the amount of $I_2$ is increased, the liquid system takes on a darker color which is indicative of the presence of the polyiodides. The polyiodide acids, which are sometimes herein referred to as $HI_3$, undoubtedly contain higher polyiodide acids, such as $HI_5$ and $HI_7$, and are considered to be complexes wherein the HI and the $I_2$ have a stronger attraction for each other than exists between the HI and the $SO_2$.

When the $I_2$ level reaches about 1.8 grams per gram of $H_2O$, phase separation begins to occur; and above about 2 grams a very clean separation of the two liquid phases (and thus a separation of the sulfuric acid and hydrogen iodide reaction products) is accomplished. The affinity of these polyiodide acids for water and the fact that the complexes thus formed with water reject the sulfuric acid solution are believed to account for the formation of the lighter phase which separates, as the chemical reaction continues mainly in the heavier phase. Although the lighter phase contains most of the sulfuric acid, the reaction products are not exclusive to one phase, and thus the overall recovery process should take into consideration the presence of the small amount of sulfuric acid in the heavier aqueous phases.

The present improvement is concerned with the treatment of the heavier phase to effect recovery of an increased yield of the reaction products. The heavier phase contains substantially all of the hydrogen iodide, generally in the form of hydrogen polyiodides as a result of the excess of iodine; it also contains water, sulfur dioxide and a minor portion of sulfuric acid. The reaction will continue in the heavier phase, as dictated by the equilibrium constants, so long as all of the reactants are present.

The reaction can be carried out as either a batch reaction or as a part of a continuous process, and in either instance, the heavier phase is separated from the lighter phase to begin the recovery process. An initial filtering of the heavier phase may be performed to remove, for example, any undissolved iodine that might possibly be present. Usually, the separated heavier phase is degassed, by subjecting it to a slightly elevated temperature or to vacuum, or both, in order to remove the more volatile sulfur dioxide, which was provided in excess as one of the initial reactants in the main reaction zone.

After degassing, hydrogen iodide and iodine is added to the heavier phase to cause the creation of an immiscible phase, which is lighter in density and in color and which contains substantially all of the remaining sulfuric acid. This immiscible phase is removed and combined with initially separated lighter phase, and they are treated together for decomposition of the sulfuric acid in order to recover $H_2O$ and $SO_2$ for return to the main reaction zone and gaseous $O_2$ as a product.

Assuming that the heavier phase was initially saturated with iodine, to the extent there even might have been some undissolved iodine removed in the initial filtering step, it would not be expected that any additional iodine could be added at this time. However, it has been found that if hydrogen iodide is added to the solution, additional iodine can then be accommodated. Moreover, it has been found that if both hydrogen iodide and iodine are added to the degassed heavier phase, an immiscible layer is formed, which is both lighter in density and lighter in color. The immiscible layer is essentially an aqueous solution of sulfuric acid, and it separates as a result of the same mechanism that caused the creation of the heavier and lighter phases in the main reaction zone.

Gaseous hydrogen iodide can be bubbled into the heavier phase so that it will dissolve therein while the iodine is being added in crystalline form with stirring. The temperature of the heavier phase during this addition may be between about $-30°$ C. and about 135° C. and is preferably below about 115° C.

Normally, the degassed heavier phase will contain between about 7 and about 20 weight percent water, between about 10 and about 25 weight percent hydrogen iodide, between about 82 and about 55 weight percent reducible iodine and up to about 2 weight percent sulfuric acid. At least about 2 grams of iodine are added for each 10 grams of water present in the heavier phase, and preferably four or more grams of iodine are added. A sufficient amount of HI is added to permit the dissolution of the desired amount of iodine, which will generally be an amount by weight between about 50 and about 95 weight percent of the iodine that is being added. The addition of the hydrogen iodide and iodine causes a lighter phase of sulfuric acid solution to be formed, which is about a 50 percent aqueous solution of sulfuric acid. It is believed that it is the increasing iodine and the decreasing water fractions in the degassed heavier phase which cause this change in character, resulting in the rejection of the sulfuric acid and the creation of the lighter immiscible phase. It is practicable to separate more than 50 weight percent of the sulfur remaining in the heavier phase by such addition, and preferably at least about 30 percent of the remaining sulfur is separated.

It might seem that the addition of hydrogen iodide would theoretically be adverse to achieving a good yield, because it would tend to drive the equation (A) reaction back to the left by accordingly increasing the reducing potential of the aqueous solution. However, it has been found that the slow kinetics of the reduction reaction come into play, and this slowness allows the sulfuric acid separation into the lighter immiscible phase to take place before any significant reduction of sulfuric acid occurs. As a result of this procedure, an increase in the yield of the oxygen-producing product (sulfuric acid) is obtained, while at the same time the hydrogen-producing reaction product ($HI_x$) is protected from oxidation.

After the immiscible lighter phase has been separated, the remainder of the degassed heavier phase will essentially contain polyiodides and water. The aqueous solution can be transferred to a distillation column to separate the hydrogen iodide as a vapor. As this occurs, the solution will become more concentrated in iodine, and iodine will precipitate out. However, the hydrogen iodide and water form an azeotrope (at about 57 weight percent hydrogen iodide), and thus azeotropic separation techniques are necessary. In one preferred technique, phosphoric acid is added which first causes precipitation of a major portion of the iodine, and second provides dehydration assistance in breaking the azeotrope so as to permit recovery of substantially dry hydrogen iodide.

Once hydrogen iodide is liberated, hydrogen can be recovered by pyrolysis according to the equation: $2HI \rightarrow H_2 + I_2$, or by some other suitable reaction known to the art. Pyrolysis can be carried out non-catalytically at practical rates at about 625° C. and above at atmospheric pressure, and by the use of substantially higher pressures, the temperature range can be reduced to as low as about 300° C., and may be reduced even lower if a catalyst is employed. Decomposition can also be effectively carried out photolytically as described in U.S. Pat. No. 3,995,016, issued Nov. 30, 1976 to P. A. Kittle. As a result of the pyrolysis reaction, gaseous hydrogen is produced along with iodine, which is condensed to a liquid and may be further cooled to solid form. In a continuous cycle, iodine is reused either in the main Bunsen equation reaction, or for the supplementary addition of iodine to remove the residual sulphuric acid from the heavier phase.

The lighter aqueous sulphuric acid phase is heated and/or subjected to vacuum to drive off sulfur dioxide, and the resulting degassed stream is transferred to a still. The lower boiling water is removed at the still, and thereafter the sulfuric acid is vaporized and thermally decomposed, usually at a temperature between about 335° C. and about 950° C. This treatment is well known in the art and is shown, for example, in U.S. Pat. No. 3,888,750, issued June 10, 1975 to Brecher et al., wherein the thermochemical decomposition of sulfuric acid, with the resultant production of oxygen, sulfur dioxide and water, is illustrated and described in detail. The water and sulfur dioxide are recycled to the main reaction zone, and the oxygen is recovered separately as a product of the overall reaction.

A continuous process in accordance with the invention is shown in the accompanying FIGURE. The main reaction in accordance with the Bunsen equation is carried out in a reactor 10 wherein water and iodine are supplied at a radio of about 2,3 parts of iodine to 1 part of water. Sulfur dioxide is constantly bubbled through the reactor 10 so that the reaction mixture remains saturated in sulfur dioxide at atmospheric pressure. As the reaction proceeds, a two-phase liquid system is created, and the lighter and heavier phases are separately drawn off.

The heavier phase is, optionally, fed first through filter 12 to remove solids, e.g., undissolved iodine, and is then passed to a stripper 14 wherein the unreacted sulfur dioxide is removed by subjection to vacuum and/or heating. The resultant degassed stream is then conducted to a mixer-separator 16 where hydrogen iodide and iodine are added in the desired amounts. The lighter immiscible phase which forms is drawn off separately and is directly combined with the lighter phase from the main reactor 10 although, alternatively, it may be degassed of HI first.

The remainder of the heavier phase is transferred to azeotropic distillation apparatus 18, where it is treated to produce iodine, water and vaporous hydrogen iodide. The hydrogen iodide is non-catalytically pyrolized in a decomposition vessel 20 at a temperature of about 600° C. and atmospheric pressure creating hydrogen and iodine. The iodine product is returned to the main reactor 10 and is also available for use in the mixter-separator 16. The gaseous hydrogen product is collected.

The lighter phase is transferred to a stripper 22 where it is heated to about 200° C. to remove the sulfur dioxide and some of the water which is present. Concentrated sulfuric acid from the stripper 22 is transferred to a distillation column 24 where the remaining water is distilled. The $H_2SO_4$ is vaporized in a decomposition chamber 26 and subjected to a temperature of about 750° C., at atmospheric pressure, in the presence of a platinum catalyst to break it down to sulphur dioxide, water and oxygen. The water and sulfur dioxide are returned to the main reactor 10, and the oxygen is collected as a product.

Although the invention has been described with regard to certain preferred embodiments, it should be understood that changes and modifications as would be obvious to one having the ordinary skill in the art may be made without departing from the scope of this invention which is defined by the claims appended hereto. Various of the features of the invention are set forth in the claims which follow.

What is claimed is:

1. In a process for the production of hydrogen from water which process includes the steps of 1. making hydrogen iodide and sulfuric acid by the reaction of $I_2$, $SO_2$ and $H_2O$, said reaction being carried out with $SO_2$ present in a substantial molar excess with respect to the available $H_2O$ and with $I_2$ also present in an excess so as to cause the formation of a lighter sulfuric acid-bearing phase and a heavier hyrogen iodide-bearing phase, containing residual sulfuric acid, which phases are distinct from each other.
2. separating said heavier phase from said lighter phase,
3. degassing said heavier phase to remove essentially all of the unreacted $SO_2$ therein and
4. treating said heavier phase so as to separate said hydrogen iodide and cuase the decomposition thereof to form hydrogen, wherein the improvement comprises promptly adding HI and $I_2$ to said degassed portion to cause the formation of a light immiscible fraction containing an aqueous solution of sulfuric acid and removing said light immiscible fraction to thereby substantially reduce the sulfur content of said degassed heavier phase.

2. The process in accordance with claim 1 wherein iodine is added in an amount equal to at least about two grams for each 10 grams of water contained in said degassed phase.

3. The process in accordance with claim 2 wherein said $I_2$ is added in an amount equal to at least four grams for each 10 grams of water.

4. The process in accordance with claim 2 wherein said hydrogen iodide is added in an amount equal to at least about 50 weight percent of said iodine which is added.

5. The process in accordance with claim 2 wherein said temperature of said degassed phase is maintained below about 115° C. during said HI – $I_2$ addition.

6. The process in accordance with claim 5 wherein at least about 30 percent of said sulfuric acid in said heavier phase is removed.

7. A continuous process for the thermochemical production of hydrogen from water, which process comprises the steps of supplying $I_2$, $SO_2$ and $H_2O$ to a reaction zone for the creation of hydrogen iodide and sulfuric acid, said reactants being supplied in amounts so as to cause the formation of a lighter sulfuric acid-bearing phase and a heavier hydrogen-iodide-bearing phase, which liquid phases are distinct from each other, separately removing said heavier phase and said lighter phase from said reaction zone, degassing said heavier phase to remove essentially all of the unreacted $SO_2$, adding HI and $I_2$ to said degassed phase to cause the formation of a light immiscible fraction containing sulfuric acid and water, removing said light immiscible fraction to thereby substantially reduce the sulfur content of the remainder of said degassed phase, separating hydrogen iodide from the remainder of said degassed phase, treating said separated hydrogen iodide to recover gaseous hydrogen and iodine, and returning said recovered iodine for re-use in said process.

8. The process of claim 7 wherein iodine is added in an amount equal to at least about two grams for each 10 grams of water contained in said degassed phase.

9. The process in accordance with claim 8 wherein said hydrogen iodide is added in an amount equal to at least about 50 weight percent of said iodine which is added.

10. The process in accordance with claim 9 wherein said $I_2$ is added in an amount equal to at least four grams for each 10 grams of water.

11. The process in accordance with claim 7 wherein, following separation of said lighter immiscible fraction, iodine is precipitated from said remainder of said degassed phase.

12. The process in accordance with claim 8 wherein said temperature of said degassed phase is maintained below about 115° C. during said HI – $I_2$ addition.

13. The process in accordance with claim 9 wherein at least about 30 percent of said sulfuric acid in said heavier phase is removed.

* * * * *